(12) United States Patent
Paradis

(10) Patent No.: US 9,277,734 B1
(45) Date of Patent: Mar. 8, 2016

(54) SHOCK COLLAR ASSEMBLY WITH PROXIMITY SENSORS

(71) Applicant: Luc J. Paradis, Demorestville (CA)

(72) Inventor: Luc J. Paradis, Demorestville (CA)

(*) Notice: Subject to any disclaimer, the term of this patent is extended or adjusted under 35 U.S.C. 154(b) by 275 days.

(21) Appl. No.: 13/772,587

(22) Filed: Feb. 21, 2013

(51) Int. Cl.
A01K 15/02 (2006.01)
A01K 27/00 (2006.01)

(52) U.S. Cl.
CPC ..................... A01K 27/009 (2013.01)

(58) Field of Classification Search
CPC ......... A01K 3/00; A01K 3/002; A01K 3/005; A01K 15/04; A01K 15/023; A01K 15/029; A01K 15/028; A01K 15/021; A01K 27/009
USPC ................ 119/720, 721, 856–859; 340/573.3
See application file for complete search history.

(56) References Cited

U.S. PATENT DOCUMENTS

| D298,872 S | 12/1988 | Cassel et al. |
| 5,868,100 A | 2/1999 | Marsh |
| 6,232,916 B1 | 5/2001 | Grillo et al. |
| 6,568,354 B1* | 5/2003 | Wasserman et al. .......... 119/859 |
| 6,923,146 B2 | 8/2005 | Kobitz et al. |
| 7,385,513 B2* | 6/2008 | Everest et al. ............. 340/573.1 |
| 7,786,876 B2 | 8/2010 | Troxler |
| 7,856,947 B2 | 12/2010 | Giunta |
| 8,823,513 B2* | 9/2014 | Jameson et al. ......... 340/539.13 |
| 2011/0061605 A1* | 3/2011 | Hardi et al. .................... 119/721 |
| 2011/0298615 A1* | 12/2011 | Rich et al. ............... 340/539.13 |
| 2012/0255505 A1* | 10/2012 | Gauthier ...................... 119/721 |
| 2013/0008391 A1* | 1/2013 | Berntsen ...................... 119/721 |

* cited by examiner

Primary Examiner — Joshua Huson

(57) ABSTRACT

A shock collar assembly with proximity sensors detects the proximity of a collar relative to a remote and administers a shock at a predetermined proximity. The assembly includes a collar and a pair of probes extending from the collar. A collar processor and a collar transceiver are coupled to the collar. The collar processor activates the probes upon receiving a first level signal when the animal is within a first predetermined distance from a remote. A remote processor, a remote transceiver, and a control are coupled to the remote. The remote processor activates the probes upon sending the first level signal when the animal is within the first predetermined distance. The control is operationally coupled to the collar. The collar processor activates a collar alarm and the remote processor activates a remote alarm upon receiving a second level signal when the animal is within a second predetermined distance.

1 Claim, 4 Drawing Sheets

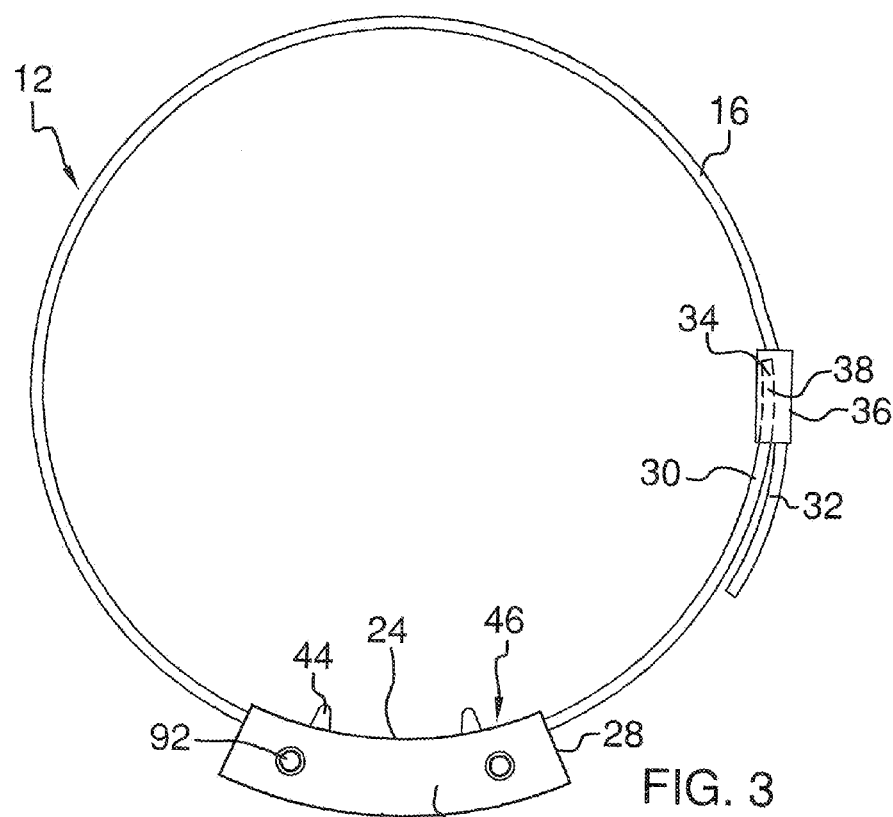
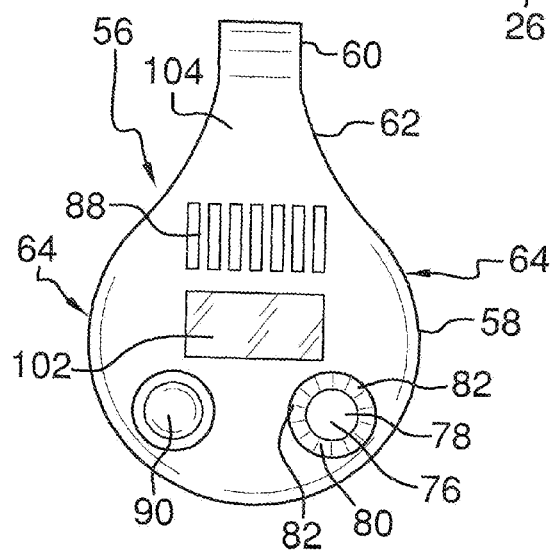

SHOCK COLLAR ASSEMBLY WITH PROXIMITY SENSORS

BACKGROUND OF THE DISCLOSURE

Field of the Disclosure

The disclosure relates to shock collars and more particularly pertains to a new shock collar for detecting the proximity of a collar relative to a remote and administering a shock at a predetermined proximity.

SUMMARY OF THE DISCLOSURE

An embodiment of the disclosure meets the needs presented above by generally comprising a collar and a pair of probes coupled to the collar. The probes extend outwardly from the collar wherein the probes are configured to abut skin of an animal when the collar is positioned around the animal's neck. A collar processor and a collar transceiver are coupled to the collar. The collar transceiver is operationally coupled to the collar processor wherein the collar processor activates the probes to administer an electrical shock to the animal upon receiving a first level signal when the animal is within a first predetermined distance and the collar is positioned around the animal's neck. A remote is configured for selectively coupling to a person. A remote processor and a remote transceiver are coupled to the remote. The remote transceiver is operationally coupled to the remote processor wherein the remote processor activates the probes upon sending the first level signal when the animal is within the first predetermined distance. A control is coupled to the remote. The control is operationally coupled to the collar. A collar alarm is operationally coupled to the collar processor wherein the collar processor activates the collar alarm upon receiving a second level signal when the animal is within a second predetermined distance. A remote alarm is operationally coupled to the remote processor wherein the remote processor activates the remote alarm upon receiving the second level signal when the animal is within the second predetermined distance.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 3 is a top view of an embodiment of the disclosure.

FIG. 4 is a front view of a remote of an embodiment of the disclosure.

DESCRIPTION OF THE PREFERRED EMBODIMENT

Figure 1:
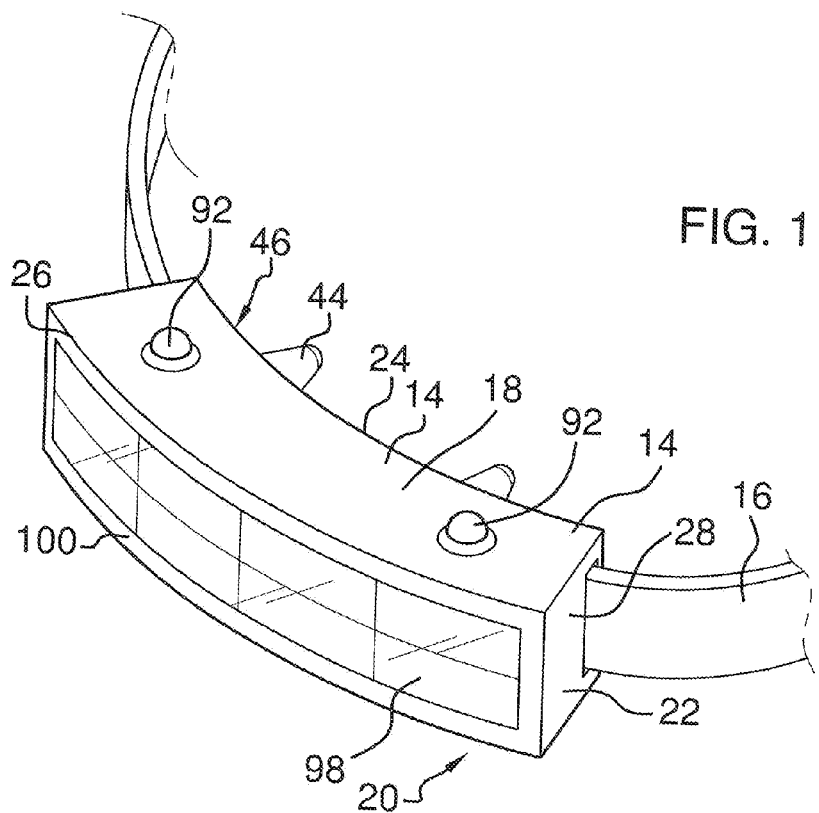
FIG. 1 is a top front side perspective view of a shock collar assembly with proximity sensors according to an embodiment of the disclosure.
Figure 2:
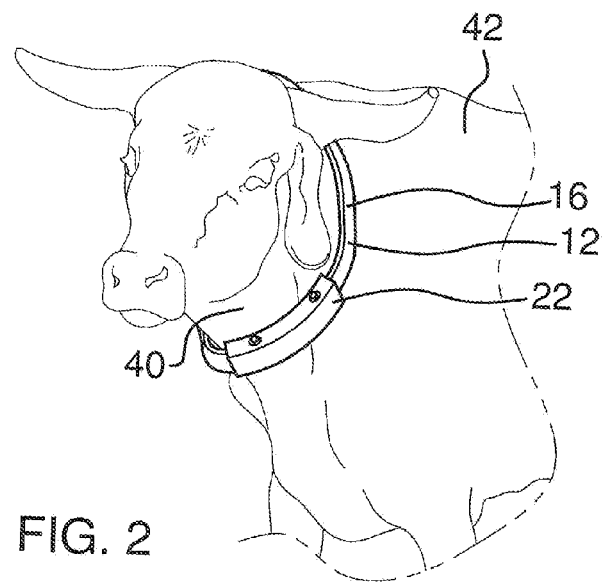
FIG. 2 is a top front side perspective view of an embodiment of the disclosure in use.
Figure 5:
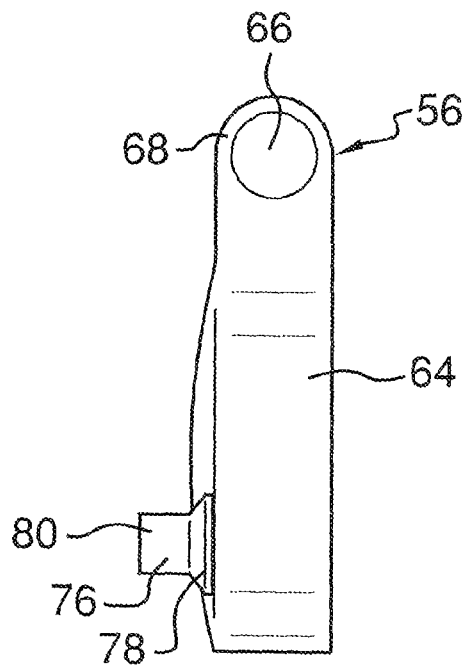
FIG. 5 is a side view of a remote of an embodiment of the disclosure.
Figure 6:
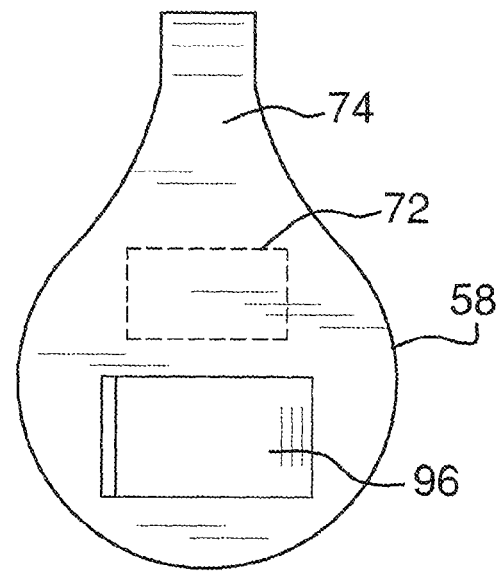
FIG. 6 is a back view of a remote of an embodiment of the disclosure.
Figure 7:
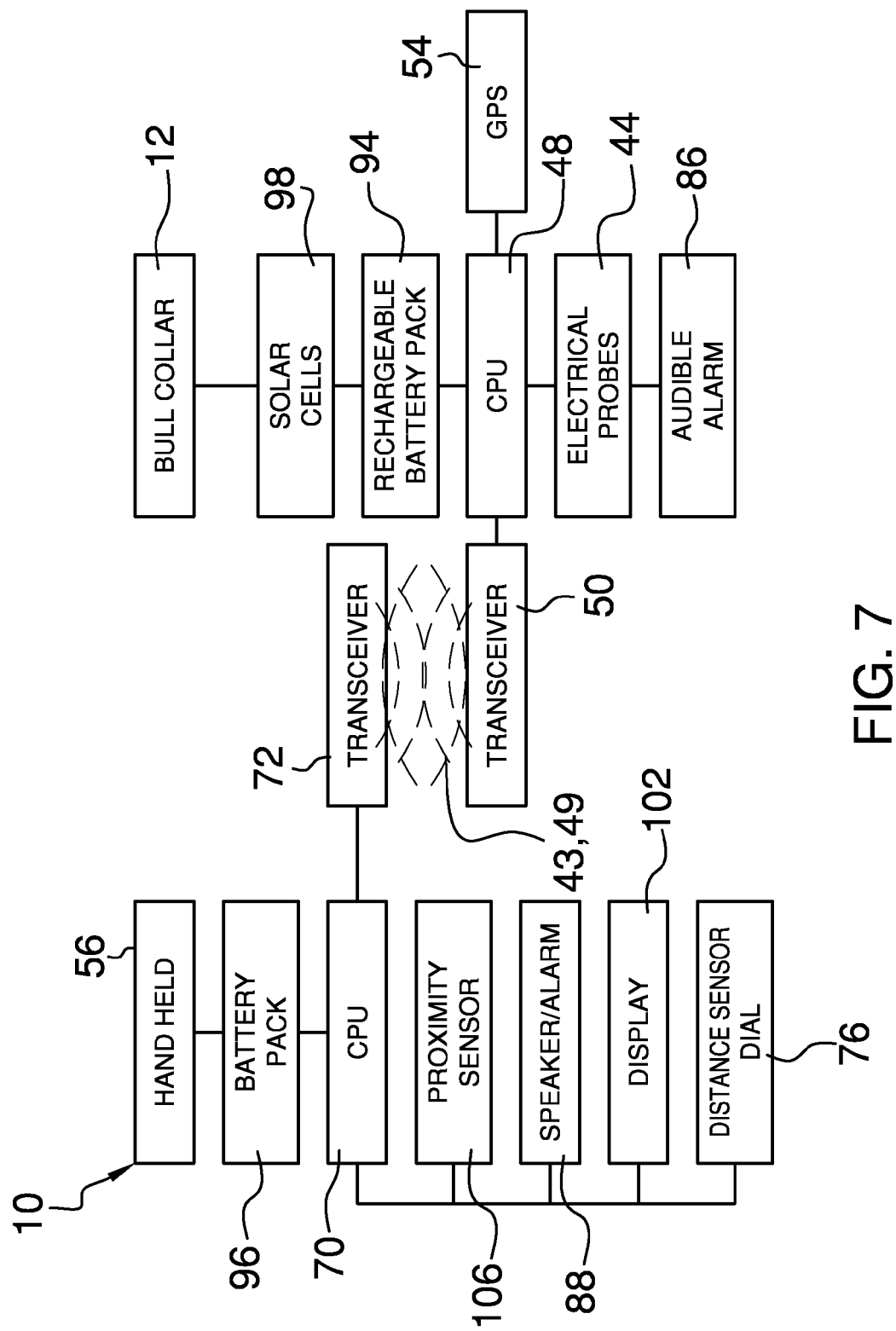
FIG. 7 is a schematic block diagram of an embodiment of the disclosure.

With reference now to the drawings, and in particular to FIGS. 1 through 7 thereof, a new shock collar embodying the principles and concepts of an embodiment of the disclosure and generally designated by the reference numeral 10 will be described.

As best illustrated in FIGS. 1 through 7, the shock collar assembly with proximity sensors 10 generally comprises a collar 12 having a housing 14 and an elongated strap 16. The strap 16 is coupled to and extends from the housing 14. The collar 12 is durable and is preferably made from solid state materials. The housing 14 has a top side 18, a bottom side 20, and a perimeter wall 22 extending between the top and bottom sides 18, 20. The top side 18 has a back edge 24 and a front edge 26 wherein the back edge 24 is concave relative to the housing 14 and the front edge 26 is convex relative to the housing 14. The strap 16 extends outward from a pair of sides 28 of the perimeter wall 22. The strap 16 has a first end 30 and a second end 32 wherein the first end 30 and the second end 32 form first and second overlapping sections 34, 36 of the strap 16. A fastener 38 is coupled to the first and second overlapping sections 34, 36 of the strap 16 wherein a circumference of the strap 16 is adjustable such that the strap 16 is configured for extending around a neck 40 of an animal 42.

A pair of spaced probes 44 is coupled to the collar 12. The probes 44 are coupled to the housing 14. The probes 44 extend outwardly from a back side 46 of the perimeter wall 22 of the housing 14 wherein the probes 44 abut skin of the animal 42 when the collar 12 is positioned around the neck 40 of the animal 42. The probes 44 are horizontally aligned. A collar processor 48 and a collar transceiver 50 are coupled to the collar 12. The collar transceiver 50 is operationally coupled to the collar processor 48 wherein the collar processor 48 activates the probes 44 to administer an electrical shock to the animal 42 upon receiving a first level signal 43 when the animal 42 is within a first predetermined distance from and the collar 12 is positioned around the animal's 42 neck 40. A global positioning system 54 is operationally coupled to the collar processor 48. The global positioning system 54 is configured for locating the animal 42 when the collar 12 is positioned around the animal's 42 neck 40.

A remote 56 is configured for selectively coupling to a person. The remote 56 may instead be placed in a location where the animal 42 is not to enter. The remote 56 may be made entirely from solid state materials. A plurality of remotes 56 may be provided to ensure a safe environment. The remote has a bulbous end 58, a base 60, and a medial section 62 extending between the bulbous end 58 and the base 60. The medial section 62 is concave relative to the bulbous end 58. The remote 56 has a pair of sides 64 wherein each side 64 extends from the base 60 to the bulbous end 58. An aperture 66 is positioned in the remote 56. The aperture 66 extends through an upper section 68 of the sides 64 of the base 60. A remote processor 70 and a remote transceiver 72 are coupled to the remote 56. A proximity sensor 106 is coupled to said remote and operationally coupled to the remote processor 70. The proximity sensor detects the proximity of the collar 12 relative to the remote 56. The remote transceiver 72 is coupled to a back side 74 of the remote 56. The remote transceiver 72 is operationally coupled to the remote processor 70 wherein the remote processor 70 activates the probes 44 upon sending the first level signal 43 when the animal 42 is within the first predetermined distance. A control 76 is coupled to the remote 56. The control 76 has a main surface 78 and a tab 80 extending from the main surface 78. The main surface 78 and the tab 80 are circular. Indicia 82 are positioned on the main surface 78 of the remote 56. The indicia 82 are graduated wherein the indicia 82 are configured to correspond to a measurement of distance between the remote 56 and the collar 12 wherein selectively manipulating the tab 80 relative to the indicia 82 sets the first predetermined distance and a second predetermined distance wherein the second predetermined distance is greater than the first predetermined distance. The first predetermined distance and the second predetermined distance are between approximately 200 centimeters and 3500 centimeters.

A collar alarm 86 is operationally coupled to the collar processor 48 wherein the collar processor 48 activates the collar alarm 86 upon receiving a second level signal 49 when the animal 42 is within the second predetermined distance. A remote alarm 88 is operationally coupled to the remote processor 70 wherein the remote processor 70 activates the remote alarm 88 upon receiving the second level signal 49 when the animal 42 is within the second predetermined distance. The collar alarm 86 and the remote alarm 88 serve to warn the animal 42 and the user, respectively, that the animal 42 is within the second predetermined distance. A panic button 90 is coupled to the remote 56. The panic button 90 is operationally coupled to the probes 44 wherein selectively manipulating the panic button 90 activates the probes 44 to administer an electrical shock to the animal 42 when the collar 12 is positioned around the animal's 42 neck 40. The panic button 90 is circular. The panic button 90 is operational up to a distance between approximately 750 centimeters and 10500 centimeters. A pair of spaced indicators 92 is coupled to the collar 12. The indicators 92 are coupled to the top side 18 of the housing 14. The indicators 92 are operationally coupled to the collar 12 wherein the indicators 92 emit a light when the collar 12 is functional. The indicators 92 may be light-emitting diodes (LED). The assembly 10 may be used to control either wild animals or domestic animals 42, such as pets, farm animals, or zoo animals.

A collar battery pack 94 is operationally coupled to the collar 12. A remote battery pack 96 is operationally coupled to the remote 56. The remote battery pack 96 is coupled to the back side 74 of the remote 56. A plurality of solar cells 98 is electrically coupled to the collar 12 wherein the solar cells 98 recharge each of the battery packs 94, 96, The solar cells 98 extend across a front side 100 of the perimeter wall 22 of the housing 14. Each of the solar cells 98 is substantially rectangular. A display 102 is coupled to the remote 56. The display 102 is coupled to a front side 104 of the remote 56. The display 102 is positioned between the remote alarm 88, the control 76, and the panic button 90. The display 102 is electronically configured for indicating the time of day.

In use, as stated above and shown in the Figures, the collar 12 is positioned around the neck 40 of the animal 42. The tab 80 is selectively manipulated relative to the indicia 82 to set the first predetermined distance and the second predetermined distance. When the animal 42 is within the second predetermined distance, the 5 collar processor 48 activates the collar 86 alarm and the remote processor 70 activates the remote alarm 88 upon receiving the second level signal 49. The collar alarm 86 and the remote processor 70 serve to warn the animal 42 and the user, respectively, that the animal is within the second predetermined distance. The collar processor 48 activates the probes 44 to administer an electrical shock to the animal 42 upon receiving the first 10 level signal 43 when the animal 42 is within the first predetermined distance. Selectively manipulating the panic button 90 activates the probes 44 to administer an electrical shock to the animal 42. Each of the battery packs 94, 96 are recharged to provide power to the assembly 10.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A shock collar assembly with proximity sensors comprising:

a collar having a housing and an elongated strap, said strap being coupled to and extending from said housing, said housing having a top side, a bottom side, and a perimeter wall extending between said top and bottom sides, said top side having a back edge and a front edge wherein said back edge is concave relative to said housing and said front edge is convex relative to said housing, said strap extending outward from a pair of sides of said perimeter wall, said strap having a first end and a second end wherein said first end and said second end form first and second overlapping sections of said strap;

a fastener coupled to said first and second overlapping sections of said strap wherein a circumference of said strap is adjustable such that said strap is configured for extending around an animal's neck;

a pair of spaced probes coupled to said collar, said probes being coupled to said housing, said probes extending outward from a back side of said perimeter wall of said housing wherein said probes abut skin of the animal when said collar is positioned around the animal's neck, said probes being horizontally aligned;

a collar processor being coupled to said collar;

a collar transceiver coupled to said collar, said collar transceiver being operationally coupled to said collar processor wherein said collar processor activates said probes to administer an electrical shock to the animal upon receiving a first level signal when the animal is within a first predetermined distance and said collar is positioned around the animal's neck;

a global positioning system operationally coupled to said collar processor, said global positioning system being configured for locating the animal when said collar is positioned around the animal's neck;

a remote, said remote being configured for selectively coupling to a person, said remote having a bulbous end, a base, and a medial section extending between said bulbous end and said base, said medial section being concave relative to said bulbous end, said remote having a pair of sides wherein each side extends from said base to said bulbous end;

an aperture positioned in said remote, said aperture being extending through an upper section of said sides of said base;

a remote processor being coupled to said remote;

a proximity sensor coupled to said remote and operationally coupled to said remote processor, said proximity sensor detecting a proximity of said collar relative to said remote;

a remote transceiver coupled to said remote, said remote transceiver being coupled to a back side of said remote, said remote transceiver being operationally coupled to said remote processor wherein said remote processor activates said probes upon sending said first level signal when the animal is within said first predetermined distance;

a control coupled to said remote, said control having a main surface and a tab extending from said main surface, said main surface and said tab being circular;

indicia positioned on said main surface of said remote, said indicia being graduated wherein said indicia is configured to correspond to a measurement of distance between said remote and said collar wherein selectively manipulating said tab relative to said indicia sets said first predetermined distance and said second predetermined distance wherein said second predetermined distance is greater than said first predetermined distance;

a collar alarm operationally coupled to said collar processor wherein said collar processor activates said collar alarm upon receiving said second level signal when the animal is within a second predetermined distance;

a remote alarm operationally coupled to said remote processor wherein said remote processor activates said remote alarm upon receiving said second level signal when the animal is within said second predetermined distance;

a panic button coupled to said remote, said panic button being operationally coupled to said probes wherein selectively manipulating said panic button activates said probes to administer an electrical shock to the animal when said collar is positioned around the animal's neck, said panic button being circular;

a pair of spaced indicators coupled to said collar, said indicators being coupled to said top side of said housing, said indicators being operationally coupled to said collar wherein said indicators emit a light when said collar is functional;

a collar battery pack being operationally coupled to said collar;

a remote battery pack being operationally coupled to said remote, said remote battery pack being coupled to said back side of said remote, each of said battery packs being rechargeable;

a plurality of solar cells electrically coupled to said collar wherein said solar cells recharge each of said battery packs, said solar cells extending across a front side of said perimeter wall of said housing, each said solar cell being substantially rectangular; and a display coupled to said remote, said display being coupled to a front side of said remote, said display being positioned between said remote alarm, said control, and said panic button, said display being electronically configured for indicating the time of day.

* * * * *